(12) United States Patent
Torii (10) Patent No.: US 9,411,123 B2
(45) Date of Patent: Aug. 9, 2016

(54) OPTICAL APPARATUS AND IMAGE PICKUP APPARATUS

(71) Applicant: CANON KABUSHIKI KAISHA, Tokyo (JP)

(72) Inventor: Shigehiro Torii, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/700,540

(22) Filed: Apr. 30, 2015

(65) Prior Publication Data

US 2015/0323759 A1    Nov. 12, 2015

(30) Foreign Application Priority Data

May 12, 2014   (JP) ................................. 2014-098405

(51) Int. Cl.
| | | |
|---|---|---|
| H04N 5/225 | (2006.01) | |
| G03B 13/00 | (2006.01) | |
| H04N 5/232 | (2006.01) | |
| G02B 13/16 | (2006.01) | |
| G03B 17/00 | (2006.01) | |
| G02B 7/04 | (2006.01) | |

(52) U.S. Cl.
CPC ........................................ G02B 7/04 (2013.01)

(58) Field of Classification Search
CPC .......... G02B 7/00; G02B 7/001; G02B 7/004; G02B 7/005; G02B 7/02; G02B 7/021; G02B 7/022; G02B 7/023; G02B 7/026; G02B 7/10; G02B 7/105; G02B 7/1827; G02B 13/08; G03B 5/00; G03B 2205/0069; H04N 5/2254
USPC ................ 348/335–369, 204.1, 204.2, 204.3, 348/204.99, 373–375; 396/529, 133
See application file for complete search history.

(56) References Cited

U.S. PATENT DOCUMENTS

| | | | | |
|---|---|---|---|---|
| 6,268,882 B1 * | 7/2001 | Elberbaum | ...... | G08B 13/19619 348/143 |
| 8,355,212 B2 * | 1/2013 | Matsumoto | ............ | G02B 7/102 359/699 |
| 9,121,735 B2 * | 9/2015 | Noguchi | ............... | G01D 5/3473 |
| 2001/0028516 A1 * | 10/2001 | Noguchi | ............... | G02B 27/646 359/823 |
| 2008/0298167 A1 * | 12/2008 | Voss | .................... | B01F 7/00808 366/152.6 |
| 2009/0268320 A1 * | 10/2009 | Uehara | ................ | G03B 11/043 359/826 |

(Continued)

FOREIGN PATENT DOCUMENTS

JP       2014035438 A    2/2014

*Primary Examiner* — Chia-Wei A Chen
(74) *Attorney, Agent, or Firm* — Rossi, Kimms & McDowell LLP (57) ABSTRACT

An optical apparatus includes a base member (101) including a first rotation limiting end and a second rotation limiting end, a cylindrical member (113) rotatable relative to the base member in a circumferential direction, an abutting member (128) fixed on the cylindrical member, capable of abutting on each of the first and second rotation limiting ends, and rotatable, along with the cylindrical member, between the first and second rotation limiting ends, a first rolling support member (107) fixed on the base member to support the cylindrical member, rotatable around an axis that is parallel to a rotation center axis of the cylindrical member, and rotatable in a direction orthogonal to the rotation center axis, and the first rolling support member is disposed in a third region where a first region and a second region in a region around the rotation center axis overlap each other.

6 Claims, 4 Drawing Sheets

(56) References Cited

U.S. PATENT DOCUMENTS

2011/0292509 A1* 12/2011 Yasuda ................ G02B 27/646
                                                359/554
2014/0043526 A1   2/2014 Noguchi
2014/0354833 A1* 12/2014 Takizawa ................ G03B 5/00
                                                348/208.3
2014/0354836 A1* 12/2014 Takizawa ................ G03B 5/00
                                                348/208.11
2014/0362242 A1* 12/2014 Takizawa ................ G03B 5/00
                                                348/208.11
2015/0241759 A1*  8/2015 Sasaki .................... G03B 17/12
                                                359/703

* cited by examiner

OPTICAL APPARATUS AND IMAGE PICKUP APPARATUS

BACKGROUND OF THE INVENTION

1. Field of the Invention

The present invention relates to an optical apparatus, and more particularly to an optical apparatus including a detector that detects rotation of a drive member to drive an optical element.

2. Description of the Related Art

Japanese Patent Laid-open No. 2014-35438 discloses a lens apparatus which is provided with a constant position guide roller mechanism to remove backlash between a drive ring and a drive base so that rotation of the drive ring to drive a focus lens can be detected by a detection system using a scale and a sensor with high accuracy.

However, the configuration disclosed in Japanese Patent Laid-open No. 2014-35438 is not concerned about the deterioration of position detection accuracy when an abutting portion of a connection key, which is attached to the drive ring to transmit rotation to the lens unit, strikes on a rotation end of the drive base in manual focusing. Commonly, a mechanical end as a drivable range in the manual focusing, which is limited by the rotation end of the drive base, is set with a margin compared to an electric end as a rotational range where autofocus driving is possible, and an angular position away from the mechanical end by a certain angle is set as the electric end. In other words, the rotational range in the autofocusing is set so as not to strike on the rotation end of the drive base. When the drive ring rotates and the abutting portion of the connection key strikes on the rotation end of the drive base in the manual focusing, due to a rotation moment, the drive ring operates to further rotate to be decentered around a contact portion, as a rotation center, between the abutting portion of the connection key and the rotation end of the drive base.

An inner surface of the drive ring is supported by a plurality of guide rollers, and at least one of the guide rollers is a biasing guide roller that is biased by a bias spring to bias the drive ring in an outer radial direction. Since this biasing guide roller is disposed in a region where the drive ring is decentered to sink in an inner radial direction due to the rotation moment according to further rotation of the drive ring, the decentering caused by further rotation of the drive ring cannot be suppressed. Although the connection key is stopped and a lens unit fitted in its front edge is also stopped, only the drive ring further rotates and the lens unit is moved as a detected value, and as a result, an actual lens position is different from a detected position (the detected value) and thus detection accuracy is negatively affected.

Position information of the mechanical end may be obtained based on a result of driving a manual focus drive region, but the drive ring is at risk of striking on the mechanical end as the rotation end of the drive base at the position of the electric end for the focus drive when the lens position is different from the detected value described above. In order to avoid such a risk, a biasing force of the bias spring to bias the biasing guide roller can be increased to endure the rotation moment. However, the drive ring is deformed by increasing the biasing force and thus the position detection accuracy may be deteriorated. In addition, a load is increased and thus sliding of the drive ring may be deteriorated.

SUMMARY OF THE INVENTION

The present invention provides an optical apparatus and an image pickup apparatus that have a configuration which is advantageous to detection of rotation of a drive member to drive an optical element.

An optical apparatus as one aspect of the present invention includes a base member including a first rotation limiting end and a second rotation limiting end, a cylindrical member rotatable relative to the base member in a circumferential direction, an abutting member fixed on the cylindrical member, capable of abutting on each of the first and second rotation limiting ends, and rotatable, along with the cylindrical member, between the first and second rotation limiting ends, a first rolling support member fixed on the base member to support the cylindrical member, rollable around an axis parallel to a rotation center axis of the cylindrical member, and movable in a direction orthogonal to the rotation center axis, a biasing member configured to bias the first rolling support member from the base member toward the cylindrical member, and second rolling support members fixed on the base member to support the cylindrical member, rollable around axes parallel to the rotation center axis, and fixed in directions orthogonal to the rotation center axis, the first rolling support member is disposed in a third region where a first region and a second region in a region around the rotation center axis overlap each other, the first region is closer to the abutting member with reference to a line connecting the rotation center axis with a first abutting portion where the abutting member abuts on the first rotation limiting end, and the second region is closer to the abutting member with reference to a line connecting the rotation center axis with a second abutting portion where the abutting member abuts on the second rotation limiting end, and at least one of the second rolling support members is disposed in a fourth region, at least another of the second rolling support members is disposed in a fifth region, the fourth region is closer to the first rotation limiting end with reference to a line connecting the rotation center axis with the first abutting portion where the abutting member abuts on the first rotation limiting end, and the fifth region is closer to the second rotation limiting end with reference to a line connecting the rotation center axis with the second abutting portion where the abutting member abuts on the second rotation limiting end.

An image pickup apparatus as another aspect of the present invention includes the optical apparatus and an image pickup element configured to receive light passing through the optical apparatus.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

A lens apparatus (optical apparatus) in an embodiment of the present invention is applied to an image pickup apparatus with interchangeable lenses which includes an interchangeable lens digital single-lens reflex camera (camera body) and an interchangeable lens (lens apparatus). However, this embodiment is not limited to this and it can also be applied to a lens-integrated image pickup apparatus which includes a camera body and a lens apparatus integrated with each other. Each of the image pickup apparatus with interchangeable lenses and the lens-integrated image pickup apparatus includes an image pickup element that receives light passing through the lens apparatus.

Embodiment 1

Figure 1:
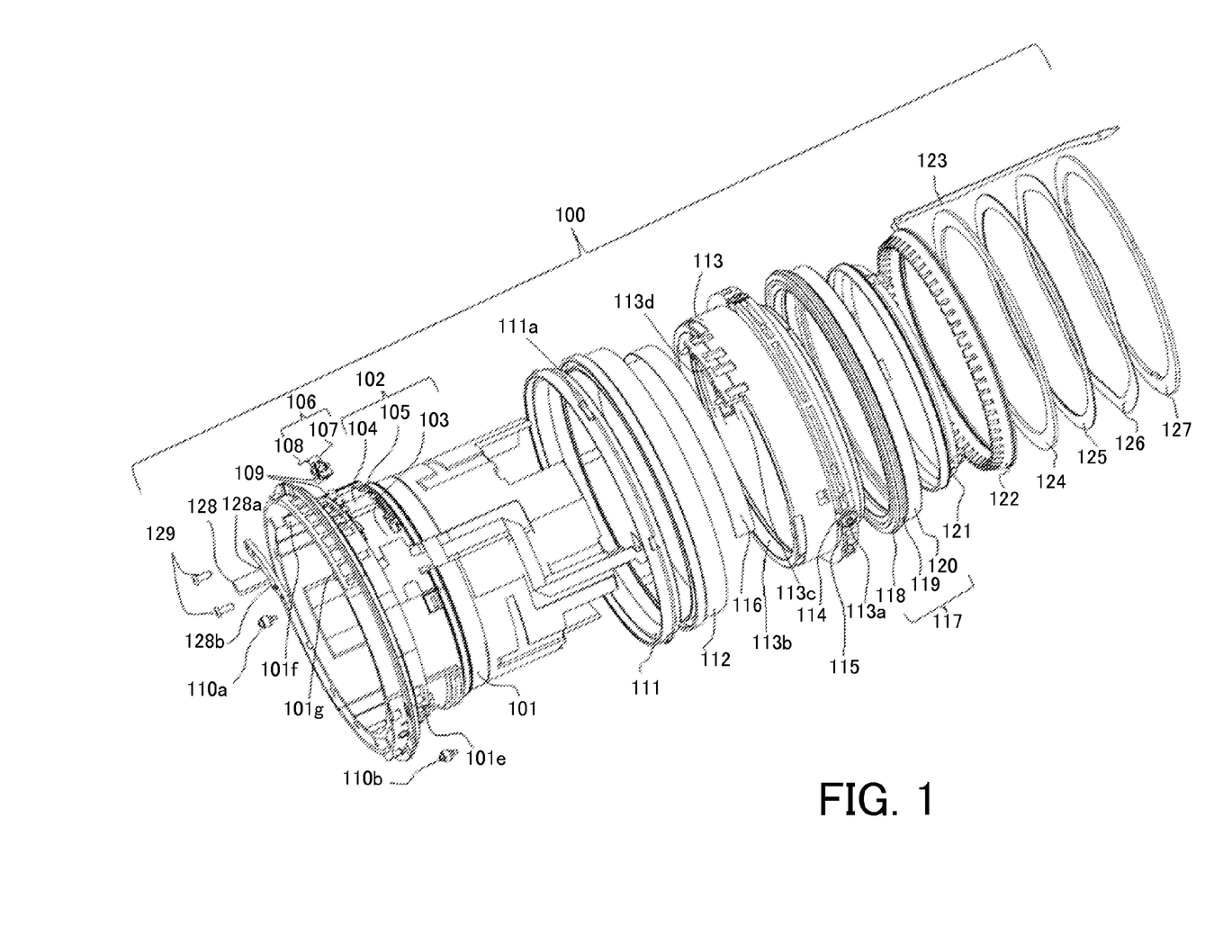
FIG. 1 is an exploded perspective view of a focus unit in Embodiment 1 of the present invention.
Figure 2:
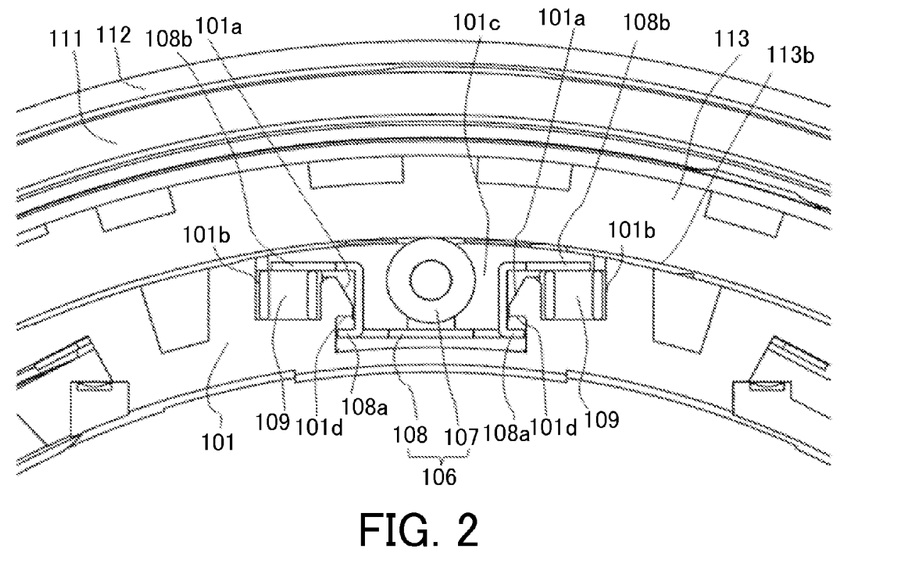
FIG. 2 is a cross-sectional view of the focus unit in Embodiment 1 of the present invention.

FIG. 1 illustrates an exploded perspective view of a focus unit 100 that is incorporated in a lens apparatus (lens barrel) in Embodiment 1 of the present invention, and FIG. 2 illustrates a cross-sectional view of the focus unit 100.

Reference numeral 101 denotes a unit base (base member), and it is a fixed member of the focus unit 100. Reference numeral 102 denotes a sensor holder unit that includes a flexible printed circuit board 103, a position detection sensor 104, and a sensor holder 105, and the sensor holder unit 102 is fixed and held on the unit base 101 in a state where the position detection sensor 104 that includes a sensing unit having a light emitting portion and a light receiving portion integrated with each other is bonded and fixed on the sensor holder 105. Reference numeral 106 denotes a biasing constant position roller unit, reference numeral 107 denotes a biasing constant position roller, and reference numeral 108 denotes a biasing sheet metal. Reference numeral 109 denotes a coil spring that biases the biasing constant position roller unit 106 from an inner radial direction toward an outer radial direction. The biasing constant position roller unit 106 is fixed on the unit base 101.

The biasing constant position roller 107 (first rolling support member) is rollable around an axis that is parallel to a center axis (optical axis 400 of a focus lens unit 201 described below) of the unit base 101, i.e. a rotation center axis of a roller ring 113 described below, and is movable in a direction orthogonal to the center axis of the unit base 101 (rotation center axis) by the action of the coil spring 109. The biasing constant position roller 107 is one of support members that supports a roller ring 113 described below.

FIG. 2 illustrates a state in which the biasing constant position roller unit 106 is built in the unit base 101. As a method of building the biasing constant position roller unit 106 into the unit base 101, first of all, the coil spring 109 is built into a circular hole 101b of the unit base 101. Next, the biasing constant position roller unit 106 that includes the biasing constant position roller 107 and the biasing sheet metal 108 integrated with each other is pressed into a groove 101c, which is formed on the unit base 101 along an inclined surface 101a of the unit base 101, for inserting the biasing constant position roller unit 106 into it. As a result, the biasing sheet metal 108 is elastically deformed to move to sink in the inner radial direction, and an arm portion 108a inserted in the groove 101c contacts a retaining portion 101d to prevent falling off the biasing sheet metal 108. Since a spring receiving portion 108b always contacts the coil spring 109, the biasing constant position roller unit 106 is always biased to the outer radial direction (i.e. direction away from the rotation center axis or the optical axis direction 400).

Returning to FIG. 1, each of reference numerals 110a and 110b denotes a fixed constant position roller (second rolling support member), and it is built into a groove 101e of the unit base 101. In this embodiment, two fixed constant position rollers 110 (110a, 110b) are disposed at an angle of 120 degrees at equal intervals with respect to the biasing constant position roller unit 106. Each of the fixed constant position rollers 110a and 110b is fixed on the unit base 101, and it is a member that is rotatable around the axis parallel to the center axis of the unit base 101 and that is fixed (immovable) in a direction orthogonal to the center axis. Each of the fixed constant position rollers 110a and 110b is one of the support members that supports the roller ring 113 described below.

As described above, the biasing constant position roller unit 106 and the fixed constant position rollers 110a and 110b are arranged at equal intervals around the center axis of the unit base 101. Reference numerals 111 and 112 denote a first manual connection ring and a second manual connection ring, respectively, that transmit rotation of a manual operation, and they are slidable in a circumferential direction with respect to the unit base 101. Reference numeral 113 denotes a roller ring that is disposed at an outer circumference of the unit base 101 and that is rotatable around the optical axis 400 relative to the unit base 101. The roller ring 113 is a cylindrical member that has a cylindrical shape rotatable in the circumferential direction relative to the unit base 101. Shafts 113a that extend in directions orthogonal to the optical axis 400 are formed on an outer circumferential surface of the roller ring 113 at three regions at equal intervals.

A roller 114 is rollably held on the shaft 113a by a retaining ring 115. A rolling portion 113b for the biasing constant position roller unit 106 and the fixed constant position rollers 110 is provided at the front side on the inner surface of the roller ring 113. Accordingly, since the roller ring 113 is always biased by the biasing constant position roller unit 106 in one outer radial direction and it always contacts the fixed constant position rollers 110, it is rotatable relative to the unit base 101 without backlash. In this case, the coil spring 109 (biasing member) applies a biasing force to bias the biasing constant position roller 107 from the unit base 101 toward the roller ring 113.

Reference numeral 116 denotes a position detection reflective scale (position detection scale) in which a plurality of reflection surfaces provided with slits are formed in the circumferential direction. The position detection reflective scale 116 is bonded and fixed on an inner surface 113c of the roller ring 113 by using a double-sided tape, and it is disposed at a position opposite to the sensor holder unit 102 by building the roller ring 113 into the unit base 101.

In this embodiment, the position detection sensor is provided on the unit base 101 and the position detection scale is provided on the roller ring 113, but the present invention is not limited to this configuration. In other words, the position detection sensor may be provided on one of the roller ring 113 and the unit base 101, and the position detection scale may be provided on the other of the roller ring 113 and the unit base 101.

Reference numerals 117 and 118 denote a rotor unit and a connection ring, respectively, and a front end of the connection ring 118 abuts on the three rollers 114 provided on the roller ring 113. A rear end of the connection ring 118 is coupled to a rotor 120 that constitutes a vibration motor via a rubber ring 119. Reference numeral 121 denotes a rotation stopper that limits rotation of a stator 122 of the vibration motor. A flexible printed circuit board 123 integrated with a piezoelectric element PZT is bonded on a rear end of the stator 122. The vibration of the stator 122 is excited by an electric signal input from the flexible printed circuit board 123. The vibration of an elliptic motion occurs at a mass point on the front end surface of the stator 122. As a result, the rotor unit 117 that is provided by contacting with pressure on the front end surface of the stator 122 is rotatably driven.

The stator 122 is held on the unit base 101 while a pressure to the front side is applied by a pressure spring 126 and a pressure ring 127 via a felt member 124 and a felt board 125 provided at the rear side of the stator 122. This applied pressure allows the stator 122 to contact the rotor 120 with pressure and also allows the front end surface of the connection ring 118 integrated with the rubber ring 119 to contact the roller 114. Reference numeral 128 denotes a focus key (abutting portion) that transmits a rotational output of the focus unit 100 to a focus lens unit, and it is fixed on a key attachment portion 113*d* of the roller ring 113 by using a screw 129.

The focus key 128 is provided with a first abutting portion 128*a* and a second abutting portion 128*b*. Corresponding to the first and second abutting portions 128*a* and 128*b*, a first rotation limiting end 101*f* and a second rotation limiting end 101*g* are formed at the inner circumferential side of the unit base 101. The focus key 128 is capable of abutting on the first rotation limiting end 101*f* and the second rotation limiting end 101*g*, and is rotatable, along with the roller ring 113, between the first rotation limiting end 101*f* and the second rotation limiting end 101*g* in the circumferential direction. The first and second abutting portions 128*a* and 128*b* are capable of abutting on the first and second rotation limiting ends 101*f* and 101*g*, respectively, and thus a rotational range of the focus key 128 is limited.

Figure 3:
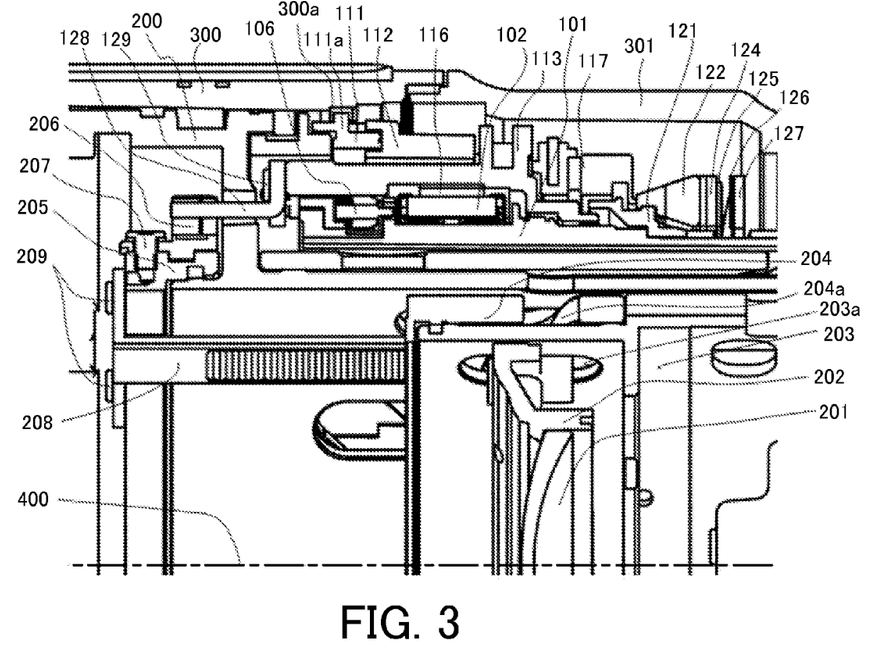
FIG. 3 is a cross-sectional view of a lens barrel in Embodiment 1 of the present invention.

FIG. 3 is a cross-sectional view of the lens barrel in Embodiment 1. Reference numeral 200 denotes a guide barrel, and it is coupled to the unit base 101 of the focus unit 100 by using a screw (not illustrated). Reference numeral 201 denotes a focus lens unit (hereinafter, referred to as a focus lens). The focus lens 201 (optical element) is movable along the optical axis 400 (in the optical axis direction) as described below. Reference numeral 202 denotes a focus barrel that holds the focus lens 201. Reference numeral 203 denotes a focus unit base on which a longitudinal groove 203*a* parallel to the optical axis direction is formed, and reference numeral 204 denotes a focus cam ring on which a cam groove 204*a* is formed. The focus barrel 202 is held by the focus unit base 203 and the focus cam ring 204 via a roller (not illustrated).

A focus connection ring 205 is a connection ring that transmits a rotational output of the focus key 128 to the focus cam ring 204. A focus piece 206 that is fitted into an end of the focus key 128 to transmit the rotation of the roller ring 113 to the focus connection ring 205 is fixed on the focus connection ring 205 via the screw 207. Furthermore, a focus connection key 208 that transmits the rotation of the focus connection ring 205 to the focus cam ring 204 is fixed by using screws 209. Reference numeral 300 denotes a manual ring, and a concave portion 300*a* on an inner circumference of the manual ring engages with a protrusion 111*a* provided on an outer circumference of the first manual connection ring 111.

Accordingly, the rotation of the manual ring 300 is input to the focus unit 100, and the output of the focus key 128 is transmitted to the fitted focus piece 206. Then, the focus connection ring 205 and the focus connection key 208 rotate integrally with the focus piece 206, and the focus cam ring 204 that is fitted to the focus connection key 208 rotates. Thus, in the configuration of this embodiment, the cam groove 204*a* and the longitudinal groove 203*a* of the focus unit base 203 act so as to move the focus barrel 202 back and forth in the optical axis direction. Reference numeral 301 denotes a fixed barrel that is fixed integrally with the guide barrel 200 by using a screw (not illustrated), and a mount can be attached to the fixed barrel 301.

Figure 4A:
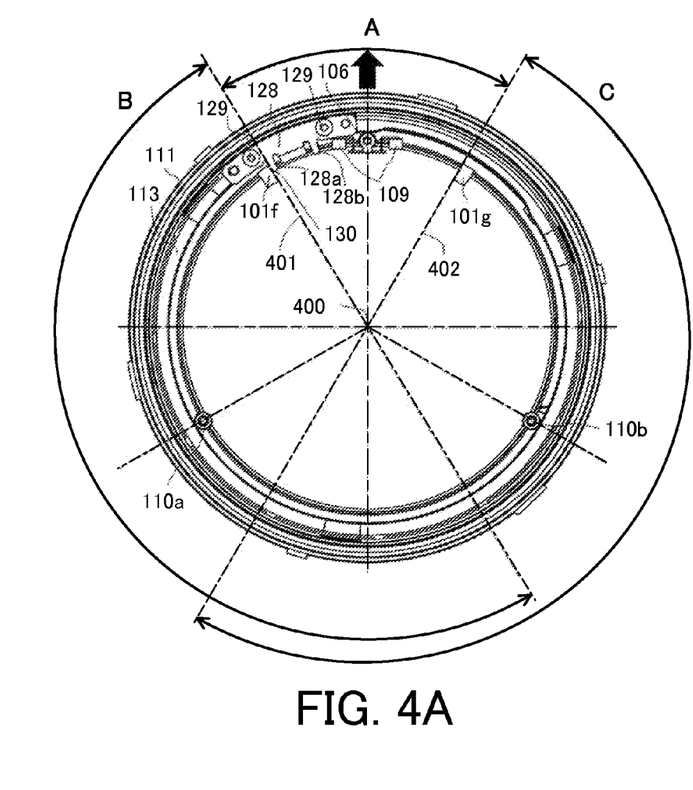
FIGS. 4A and 4B are schematic diagrams of the focus unit in Embodiment 1 of the present invention.
Figure 4B:
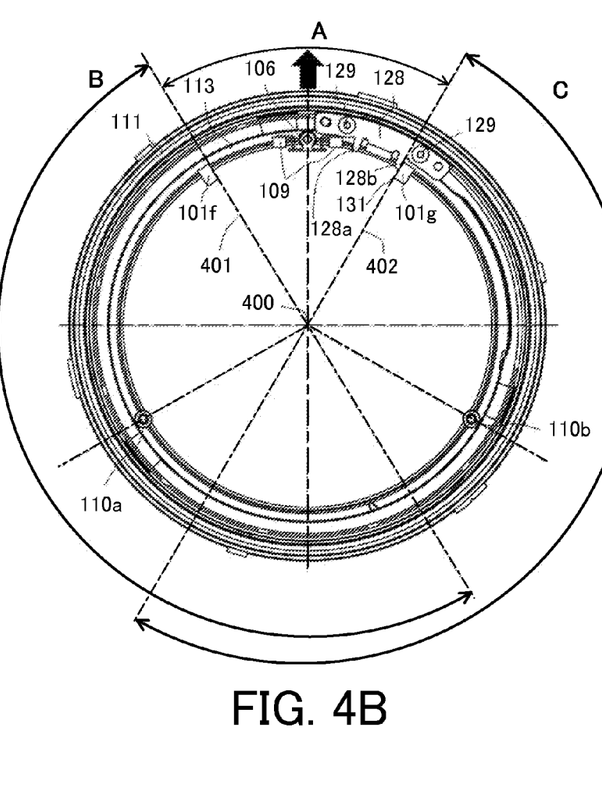

FIGS. 4A and 4B illustrate schematic diagrams of the focus unit 100 in this embodiment. For easy understanding, only the arrangement of the biasing constant position roller unit 106, the fixed constant position rollers 110, the rotation limiting ends 101*f* and 101*g* of the unit base 101, and the focus key 128 fixed on the roller ring 113 via the screw 129 is illustrated. This embodiment describes a case where a rotation angle of the roller ring 113 is within 180 degrees. The two fixed constant position rollers 110 are disposed at equal intervals of approximately 120 degrees with respect to the biasing constant position roller unit 106. As descried above, the roller ring 113 is always biased in an arrow direction in a plane of paper by the biasing constant position roller unit 106 and the coil spring 109 to remove the backlash, and it contacts total of three regions including the two fixed constant position rollers 110*a* and 110*b* to rotate when it is biased by an displacement corresponding to the backlash.

FIG. 4A illustrates a state at the moment where the roller ring 113 is rotated in a counterclockwise direction in the plane of paper and the first abutting portion 128*a* of the focus key 128 contacts the first rotation limiting end 101*f* of the unit base 101. After the first abutting portion 128*a* contracts (strikes) the first rotation limiting end 101*f*, a rotation moment (torque) is applied to the roller ring 113 around a first contact portion 130 (first abutting portion) of the first abutting portion 128*a* and the first rotation limiting end 101*f* as a rotation center and thus it further rotates to be decentered. In this time, with respect to one region (region B) including the first rotation limiting end 101*f* of two regions divided by a line 401 connecting the first contact portion 130 and the optical axis 400 as a rotation center of the roller ring 113, the roller ring 113 is decentered to move to sink in the inner radial direction. On the contrary, with respect to the other region (region other than region B) including the first abutting portion 128*a* of the two-divided regions, the roller ring 113 is decentered to float.

FIG. 4B illustrates a state at the moment where the roller ring 113 is rotated in a clockwise direction in the plane of paper and the second abutting portion 128*b* of the focus key 128 contacts the second rotation limiting end 101*g* of the unit base 101. After the second abutting portion 128*b* contracts (strikes) the second rotation limiting end 101*g*, a rotation moment (torque) is applied to the roller ring 113 around a second contact portion 131 (second abutting portion) of the second abutting portion 128*b* and the second rotation limiting end 101*g* as a rotation center and thus it further rotates to be decentered. In this time, with respect to one region (region C) including the second rotation limiting end 101*g* of two regions divided by a line 402 connecting the second contact portion 131 and the optical axis 400 as a rotation center of the roller ring 113, the roller ring 113 is decentered to move to sink in the inner radial direction. On the contrary, with respect to the other region (region other than region C) including the second abutting portion 128*b* of the two-divided regions, the roller ring 113 is decentered to float.

In this embodiment, the biasing constant position roller unit 106 is disposed in a region A other than the regions B and C in an entire region around the optical axis 400. In other words, the biasing constant position roller unit 106 is disposed in the region A (third region) other than the region B (fourth region) closer to the first rotation limiting end 101*f* with reference to the line 401 and the region C (fifth region) closer to the second rotation limiting end 101*g* with reference to the line 402.

In other words, it is disposed in the region A (third region) where a region (first region) other than the region B closer to the first abutting portion 128*a* with reference to the line 401 and a region (second region) other than the region C closer to the second abutting portion 128*b* with reference to the line 402 overlap each other. That is, the biasing constant position roller unit 106 is disposed in the region A where the roller ring 113 is not decentered to sink in the inner radial direction, i.e. region A other than the regions B and C, even when any one of the first and second abutting portions 128a and 128b contacts corresponding one of the first and second rotation limiting ends 101f and 101g.

This can also be described as follows. It is assumed that the roller ring 113 rotates around the first abutting portion (first contact portion 130) where the first abutting portion 128a abuts on the first rotation limiting end 101f in a first rotation direction (counterclockwise direction) so that the first abutting portion 128a comes close to the rotation limiting end 101f. In this case, in the region other than the region B, a gap between the roller ring 113 and the unit base 101 increases. Furthermore, it is assumed that the roller ring 113 rotates around the second abutting portion (second contact portion 131) where the second abutting portion 128b abuts on the second rotation limiting end 101g in a second rotation direction (clockwise direction) opposite to the first rotation direction. In this case, in the region other than the region C, a gap between the roller ring 113 and the unit base 101 increases.

Accordingly, the biasing constant position roller unit 106 is disposed in the region other than the regions B and C (i.e. at the region where the gap between the roller ring 113 and the unit base 101 increases in any one of the rotation directions). In other words, the biasing constant position roller unit 106 is disposed in a region where the gap between the roller ring 113 and the unit base 101 is not narrowed when a rotation moment is applied to the roller ring 113 in a state where the abutting portion abuts on the rotation limiting end.

When the roller ring 113 further rotates to be decentered after the abutting portion abuts on the rotation limiting end, the regions A, B, and C move in the counterclockwise direction in the plane of paper in FIG. 4A, and move in the clockwise direction in the plane of paper in FIG. 4B. In the region B, the fixed constant position roller 110a is disposed at a position at an angle of 90 degrees with respect to the first contact portion 130 around the optical axis 400. In FIG. 4A, the roller ring 113 rotates in the counterclockwise direction in the plane of paper, and the first abutting portion 128a of the focus key 128 contacts the first rotation limiting end 101f of the unit base 101. Then, the rotation moment is applied to the first contact portion 130 as a rotation center and thus the roller ring 113 further operates to rotate in the counterclockwise direction in the plane of paper to be decentered, but the roller ring 113 abuts on the fixed constant position roller 110a that is disposed in the region B and accordingly further rotation of the roller ring 113 can be prevented.

In this case, the fixed constant position roller 110a is disposed at an angle (within a range) of 60 degrees to 120 degrees with respect to the first contact portion 130 around the optical axis 400. As a result, a further rotating direction of the roller ring 113 around the first contact portion 130 and a normal direction of a surface of the first rotation limiting end 101f come close to each other compared to the arrangement at an angle of 0 degree to 180 degrees (i.e. 0 degree to 60 degrees, or 120 degrees to 180 degrees). Accordingly, the rotation can be further stably prevented. Preferably, the fixed constant position roller 110a is disposed at a position at an angle of 90 degrees with respect to the first contact portion 130 around the optical axis 400, and therefore the further rotating direction of the roller ring 113 around the first contact portion 130 and the normal direction of the surface of the first rotation limiting end 101f come close to each other compared to the arrangement at an angle of 60 degrees to 120 degrees (degrees other than 90 degrees). Accordingly, the rotation can be further stably prevented.

In the region C, the fixed constant position roller 110b is disposed at a position at an angle of 90 degrees with respect to the second contact portion 131 around the optical axis 400. In FIG. 4B, the roller ring 113 rotates in the clockwise direction in the plane of paper, and the second abutting portion 128b of the focus key 128 contacts the second rotation limiting end 101g of the unit base 101. Then, the rotation moment is applied to the second contact portion 131 as a rotation center and thus the roller ring 113 further operates to rotate in the clockwise direction in the plane of paper to be decentered, but the roller ring 113 abuts on the fixed constant position roller 110b that is disposed in the region C and accordingly further rotation of the roller ring 113 can be prevented.

In this case, the fixed constant position roller 110b is disposed at an angle (within a range) of 60 degrees to 120 degrees with respect to the second contact portion 131 around the optical axis 400. As a result, a further rotating direction of the roller ring 113 around the second contact portion 131 and a normal direction of a surface of the second rotation limiting end 101g come close to each other compared to the arrangement at an angle of 0 degree to 180 degrees (0 degree to 60 degrees, or 120 degrees to 180 degrees). Accordingly, the rotation can be further stably prevented. Preferably, the fixed constant position roller 110b is disposed at a position at an angle of 90 degrees with respect to the second contact portion 131 around the optical axis 400, and therefore the further rotating direction of the roller ring 113 around the second contact portion 131 and the normal direction of the surface of the second rotation limiting end 101g come close to each other compared to the arrangement at an angle of 60 degrees to 120 degrees (degrees other than 90 degrees). Accordingly, the rotation can be further stably prevented. In this embodiment, one fixed constant position roller 110a is disposed in the region B and another fixed constant position roller 110b is disposed in the region C, but this embodiment is not limited to this and at least one (one or a plurality) of the fixed constant position rollers (110a, 110b) may be disposed in each of the regions B and C as described below.

As described above, in this embodiment, the biasing constant position roller unit 106 is disposed in the region A where the roller ring 113 is not decentered to sink in the inner radial direction (i.e. region A other than the regions B and C) at any positions where the roller ring 113 is rotatable. In addition, the fixed constant position roller is disposed in each of the regions B and C, and thus the backlash can be reduced or removed by always biasing the roller ring 113, not to be decentered, in the outer radial direction by using the biasing constant position roller unit 106. Accordingly, the detection accuracy of the rotation of the roller ring 113 can be improved over an entire rotational region.

Embodiment 2

Figure 5A:
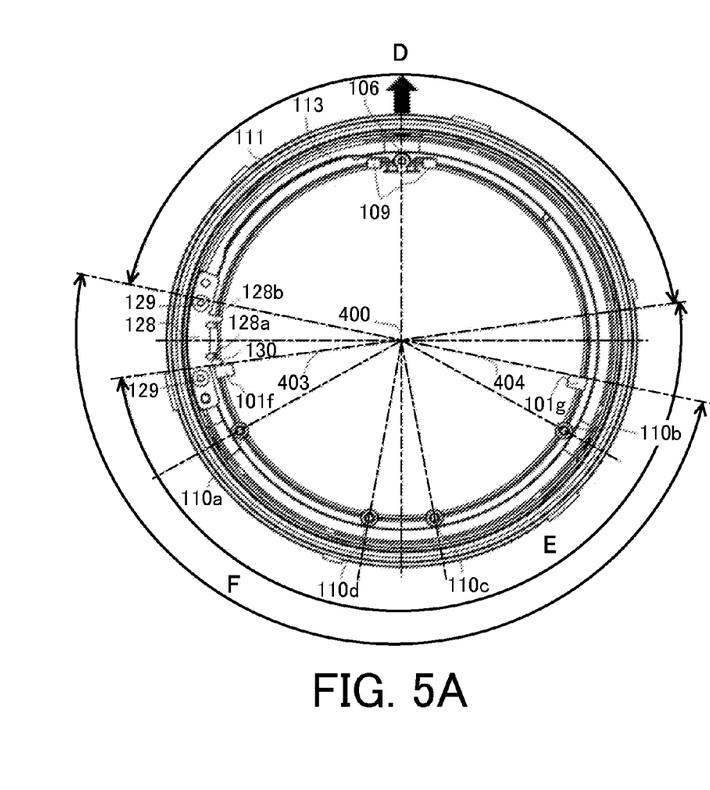
FIGS. 5A and 5B are schematic diagrams of a focus unit in Embodiment 2 of the present invention.
Figure 5B:
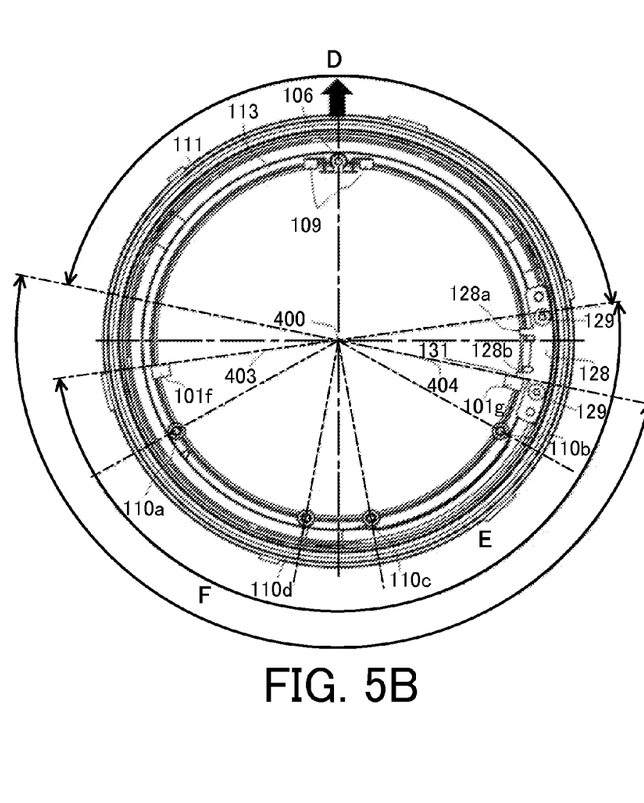

Next, Embodiment 2 of the present invention will be described. This embodiment will describe only configurations different from those in Embodiment 1. This embodiment describes a case where the rotation angle of the roller ring 113 exceeds 180 degrees. Furthermore, in this embodiment, fixed constant position rollers 110c and 110d are provided in addition to the configuration of Embodiment 1.

FIG. 5A illustrates a state at the moment where the roller ring 113 is rotated in a counterclockwise direction in the plane of paper and the first abutting portion 128a of the focus key 128 contacts the first rotation limiting end 101f of the unit base 101. After the first abutting portion 128a contracts (strikes) the first rotation limiting end 101f, a rotation moment (torque) is applied to the roller ring 113 around a first contact portion 130 of the first abutting portion 128a and the first rotation limiting end 101f as a rotation center and thus it further rotates to be decentered. In this time, with respect to one region (region E or fourth region) including the first rotation limiting end 101f of two regions divided by a line 403 connecting the first contact portion 130 and the optical axis 400 as a rotation center of the roller ring 113, the roller ring 113 is decentered to move to sink in the inner radial direction. On the contrary, with respect to the other region (region (first region) other than region E) including the first abutting portion 128a of the two-divided regions, the roller ring 113 moves to float.

FIG. 5B illustrates a state at the moment where the roller ring 113 is rotated in a clockwise direction in the plane of paper and the second abutting portion 128b of the focus key 128 contacts the second rotation limiting end 101g of the unit base 101. After the second abutting portion 128b contracts (strikes) the second rotation limiting end 101g, a rotation moment (torque) is applied to the roller ring 113 around a second contact portion 131 of the second abutting portion 128b and the second rotation limiting end 101g as a rotation center and thus it further rotates to be decentered. In this time, with respect to one region (region F or fifth region) including the second rotation limiting end 101g of two regions divided by a line 404 connecting the second contact portion 131 and the optical axis 400 as a rotation center of the roller ring 113, the roller ring 113 is decentered to move to sink in the inner radial direction. On the contrary, with respect to the other region (region (second region) other than region F) including the second abutting portion 128b of the two-divided regions, the roller ring 113 moves to float.

In other words, similarly to Embodiment 1, the biasing constant position roller unit 106 is disposed in a region where the roller ring 113 is not decentered to sink in the inner radial direction (i.e. region D (third region) other than the regions E and F) even when the focus key 128 contacts any one of the first and second rotation limiting ends 101f and 101g. When the roller ring 113 operates to further rotate to be decentered, the regions D, E, and F also move in the counterclockwise direction in the plane of paper in FIG. 5A and in the clockwise direction in the plane of paper in the clockwise direction in FIG. 5B. In the region E, the fixed constant position roller 110c is disposed at a position of 90 degrees with respect to the first contact portion 130 around the optical axis 400.

In FIG. 5A, the roller ring 113 rotates in the counterclockwise direction in the plane of paper, and the first abutting portion 128a of the focus key 128 contacts the first rotation limiting end 101f of the unit base 101. Then, the rotation moment is applied to the first contact portion 130, as a rotation center, of the first abutting portion 128a and the rotation limiting end 101f and thus the roller ring 113 further operates to rotate in the counterclockwise direction in the plane of paper to be decentered. However, the roller ring 113 abuts on the fixed constant position rollers 110a, 110b, 110c, and 110d that are disposed in the region E, and accordingly further rotation of the roller ring 113 can be prevented. In this case, the fixed constant position roller 110c is disposed at an angle (within a range) of 60 degrees to 120 degrees with respect to the first contact portion 130 around the optical axis 400. As a result, a further rotating direction of the roller ring 113 around the first contact portion 130 and a normal direction of a surface of the first rotation limiting end 101f come close to each other compared to the arrangement at an angle of 0 degree to 180 degrees. Accordingly, further rotation can be prevented. Preferably, the fixed constant position roller 110c is disposed at a position at an angle of 90 degrees with respect to the first contact portion 130 around the optical axis 400, and therefore the further rotating direction of the roller ring 113 around the first contact portion 130 and the normal direction of the surface of the first rotation limiting end 101f come close to each other compared to the arrangement at an angle of 60 degrees to 120 degrees. Accordingly, further rotation can be prevented.

In the region F, the fixed constant position roller 110d is disposed at the position of 90 degrees with respect to the second contact portion 131 around the optical axis 400. In FIG. 5B, the roller ring 113 rotates in the clockwise direction in the plane of paper and the second abutting portion 128b of the focus key 128 contacts the second rotation limiting end 101g of the unit base 101. Then, the rotation moment is applied to the second contact portion 131, as a rotation center, of the second abutting portion 128b and the second rotation limiting end 101g, and thus the roller ring 113 further operates to rotate in the clockwise direction in the plane of paper to be decentered. However, the roller ring 113 abuts on the fixed constant position rollers 110a, 110b, 110c, and 110d that are disposed in the region F, and accordingly further rotation of the roller ring 113 can be prevented. In this case, the fixed constant position roller 110d is disposed at an angle (within a range) of 60 degrees to 120 degrees with respect to the second contact portion 131 around the optical axis 400. As a result, a further rotating direction of the roller ring 113 around the second contact portion 131 and a normal direction of a surface of the second rotation limiting end 101g come close to each other compared to the arrangement at an angle of 0 degree to 180 degrees. Accordingly, further rotation can be prevented. Preferably, the fixed constant position roller 110d is disposed at a position at an angle of 90 degrees with respect to the second contact portion 131 around the optical axis 400, and therefore the further rotating direction of the roller ring 113 around the second contact portion 131 and the normal direction of the surface of the second rotation limiting end 101g come close to each other compared to the arrangement at an angle of 60 degrees to 120 degrees. Accordingly, further rotation can be prevented.

As described above, in this embodiment, the biasing constant position roller unit 106 is disposed in the region D where the roller ring 113 is not decentered to sink in the inner radial direction (i.e. region D other than the regions E and F) at any positions where the roller ring 113 is rotatable. In addition, the fixed constant position roller is disposed in each of the regions E and F, and thus the backlash can be reduced or removed by always biasing the roller ring 113, not to be decentered, in the outer radial direction by using the biasing constant position roller unit 106. Accordingly, the detection accuracy of the rotation of the roller ring 113 can be improved over an entire rotational region.

In each embodiment, one biasing constant position roller unit 106 is provided, but the embodiment is not limited to this and at least one biasing constant position roller unit 106 can be provided, i.e. for example two or three units may be provided if they are capable of biasing the roller ring 113 in a direction of the outer radial direction. Similarly, the fixed constant position rollers 110 may be further added if further rotation of the roller ring 113 and the backlash between the unit base 101 and the roller ring 113 can be suppressed. Each embodiment describes a case where the roller ring 113 and the focus key 128 are separated from each other, but the embodiment is not limited to this and alternatively they can be integrated with each other. In each embodiment, the position detection sensor 104 uses an optical sensor, but the embodiment is not limited to this and other position detection methods using a magnetic sensor, a contact sensor with a brush, or the like, may also be applied.

As described above, according to each embodiment, a biasing constant position roller unit 106 is disposed in a region where the roller ring 113 is not decentered to sink in the inner radial direction (i.e. region which is not affected by decentering) at any positions where the roller ring 113 is rotatable. In addition, the fixed constant position roller is disposed in a region where the roller ring 113 is decentered to sink in the inner radial direction, and thus the backlash can be reduced or removed by always biasing the roller ring 113, not to be decentered, in the outer radial direction by using the biasing constant position roller unit 106. Accordingly, the detection accuracy of the rotation of the roller ring 113 can be improved over an entire rotational region.

According to each embodiment, an optical apparatus and an image pickup apparatus that have a configuration which is advantageous to detection of rotation of a drive member to drive an optical element can be provided.

Each embodiment can be suitably applied to an image pickup apparatus such as a digital still camera, a single-lens reflex camera, and a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-098405, filed on May 12, 2014, which is hereby incorporated by reference herein in its entirety.

What is claimed is:

1. An optical apparatus comprising:
a base member including a first rotation limiting end and a second rotation limiting end;
a cylindrical member rotatable relative to the base member in a circumferential direction;
an abutting member fixed on the cylindrical member, capable of abutting on each of the first and second rotation limiting ends, and rotatable, along with the cylindrical member, between the first and second rotation limiting ends;
a first rolling support member supported on the base member to support the cylindrical member, rollable around an axis parallel to a rotation center axis of the cylindrical member, and movable in a direction orthogonal to the rotation center axis;
a biasing member configured to bias the first rolling support member from the base member toward the cylindrical member; and
second rolling support members fixed on the base member to support the cylindrical member, rollable around axes parallel to the rotation center axis, and fixed in directions orthogonal to the rotation center axis,
wherein the first rolling support member is disposed in a third region where a first region and a second region in a region around the rotation center axis overlap each other, the first region is closer to the abutting member with reference to a line connecting the rotation center axis with a first abutting portion where the abutting member abuts on the first rotation limiting end, and the second region is closer to the abutting member with reference to a line connecting the rotation center axis with a second abutting portion where the abutting member abuts on the second rotation limiting end, and
wherein at least one of the second rolling support members is disposed in a fourth region, at least another of the second rolling support members is disposed in a fifth region, the fourth region is closer to the first rotation limiting end with reference to the line connecting the rotation center axis with the first abutting portion where the abutting member abuts on the first rotation limiting end, and the fifth region is closer to the second rotation limiting end with reference to the line connecting the rotation center axis with the second abutting portion where the abutting member abuts on the second rotation limiting end.

2. The optical apparatus according to claim 1,
wherein the at least one of the second rolling support members is disposed around the rotation center axis within a range of 60 degrees to 120 degrees with respect to the first abutting portion, and
wherein the at least another of the second rolling support members is disposed around the rotation center axis within a range of 60 degrees to 120 degrees with respect to the second abutting portion.

3. The optical apparatus according to claim 1,
wherein the at least one of the second rolling support members is disposed around the rotation center axis at an angle of 90 degrees with respect to the first abutting portion, and
wherein the at least another of the second rolling support members is disposed around the rotation center axis at an angle of 90 degrees with respect to the second abutting portion.

4. The optical apparatus according to claim 1, further comprising an optical element movable in an optical axis direction, wherein the cylindrical member rotates in the circumferential direction to move the optical element in the optical axis direction.

5. The optical apparatus according to claim 1, wherein:
one of the cylindrical member and the base member is provided with a position detection sensor, and
the other of the cylindrical member and the base member is provided with a position detection scale.

6. An image pickup apparatus comprising:
an optical apparatus, and
an image pickup element configured to receive light passing through the optical apparatus, wherein the optical apparatus comprises:
a base member including a first rotation limiting end and a second rotation limiting end;
a cylindrical member rotatable relative to the base member in a circumferential direction;
an abutting member fixed on the cylindrical member, capable of abutting on each of the first and second rotation limiting ends, and rotatable, along with the cylindrical member, between the first and second rotation limiting ends;
a first rolling support member supported on the base member to support the cylindrical member, rollable around an axis parallel to a rotation center axis of the cylindrical member, and movable in a direction orthogonal to the rotation center axis;
a biasing member configured to bias the first rolling support member from the base member toward the cylindrical member; and
second rolling support members fixed on the base member to support the cylindrical member, rollable around axes parallel to the rotation center axis, and fixed in directions orthogonal to the rotation center axis,
wherein the first rolling support member is disposed in a third region where a first region and a second region in a region around the rotation center axis overlap each other, the first region is closer to the abutting member with reference to a line connecting the rotation center axis with a first abutting portion where the abutting member abuts on the first rotation limiting end, and the second region is closer to the abutting member with reference to a line connecting the rotation center axis with a second abutting portion where the abutting member abuts on the second rotation limiting end, and wherein at least one of the second rolling support members is disposed in a fourth region, at least another of the second rolling support members is disposed in a fifth region, the fourth region is closer to the first rotation limiting end with reference to the line connecting the rotation center axis with the first abutting portion where the abutting member abuts on the first rotation limiting end, and the fifth region is closer to the second rotation limiting end with reference to the line connecting the rotation center axis with the second abutting portion where the abutting member abuts on the second rotation limiting end.

* * * * *